US011939153B2

(12) United States Patent
Young

(10) Patent No.: US 11,939,153 B2
(45) Date of Patent: Mar. 26, 2024

(54) REFUSE CONTAINER LID OPENING DEVICE HAVING DROP-DOWN TONGUE

(71) Applicant: Daniel L. Young, San Anselmo, CA (US)

(72) Inventor: Daniel L. Young, San Anselmo, CA (US)

( * ) Notice: Subject to any disclaimer, the term of this patent is extended or adjusted under 35 U.S.C. 154(b) by 0 days.

(21) Appl. No.: 17/386,310

(22) Filed: Jul. 27, 2021

(65) Prior Publication Data

US 2022/0033180 A1 Feb. 3, 2022

Related U.S. Application Data

(60) Provisional application No. 63/058,453, filed on Jul. 29, 2020, provisional application No. 63/058,454, filed on Jul. 29, 2020.

(51) Int. Cl.

*B65F 1/16* (2006.01)
*B65F 1/02* (2006.01)
*B65F 1/14* (2006.01)

(52) U.S. Cl.

CPC .............. *B65F 1/1623* (2013.01); *B65F 1/02* (2013.01); *B65F 1/1646* (2013.01); *B65F 1/1473* (2013.01); *B65F 2001/1653* (2013.01)

(58) Field of Classification Search

CPC ........ B65F 1/1623; B65F 1/02; B65F 1/1646; B65F 1/1473; B65F 2001/1653; B65F 1/16; B65F 1/1615; B65F 2001/1669; B65F 2001/1676; B65D 43/16; B65D 43/24

USPC .......................................................... 220/263

See application file for complete search history.

(56) References Cited

U.S. PATENT DOCUMENTS

| | | | | | |
|---|---|---|---|---|---|
| 4,746,008 | A * | 5/1988 | Heverly | B65D 55/02 220/837 |
| 6,772,902 | B1 * | 8/2004 | White | B65D 50/046 220/283 |
| 2004/0206759 | A1 * | 10/2004 | Busch | B65F 1/1615 220/908 |
| 2005/0178765 | A1 * | 8/2005 | Howes | B65F 1/1615 220/210 |
| 2008/0011761 | A1 * | 1/2008 | Gnepper | B65D 43/162 220/608 |
| 2019/0152695 | A1 * | 5/2019 | Wegner | B65F 1/06 |
| 2019/0161271 | A1 * | 5/2019 | Dworkin | E05C 1/004 |

* cited by examiner

*Primary Examiner* — John K Fristoe, Jr.
*Assistant Examiner* — Laura E. Parker
(74) *Attorney, Agent, or Firm* — Brian Beverly; Beeson Skinner Beverly, LLP

(57) ABSTRACT

A refuse container lid opening device includes a lid hingedly attached to a container body for covering the container body's top opening. The lid is free of grabbable handles or protuberances but an elongated tongue descending from its underside is received in a slot in the top rim of the container body and is accessible outward of the container body. Upward movement of the tongue when the lid is closed raises the lid above the top rim of the container body to form a manually accessible gap in which a hand can be inserted to fully open the lid.

12 Claims, 7 Drawing Sheets

REFUSE CONTAINER LID OPENING DEVICE HAVING DROP-DOWN TONGUE

CROSS-REFERENCE TO RELATED APPLICATIONS

This application claims the benefit of U.S. Provisional Application No. 63/058,453 filed Jul. 29, 2020, and it claims the benefit of U.S. Provisional Application No. 63/058,454, filed Jul. 29, 2020.

BACKGROUND

Field of the Invention

This invention relates to a lidded waste container that is resistant to opening by wild animals such as raccoons, foxes, opossums and the like.

Description of Related Art

Many attempts have been devised to address the common problem of wild animals gaining access to refuse containers stored outside. Raccoons are especially adept at learning how to open refuse container by cleverly making use of their dexterous paws. Prior art solutions vary from simple catches and snaps, to strapping down the container's lid using bungie cords, to sophisticated locking mechanisms. Many of these attempts assume that the container has one or more surfaces or edges that can be snagged or gripped by the paws of an animal and hope to lock the container closed despite a creature's ability to find a "paw" hold with which to pry the container open.

SUMMARY OF THE INVENTION

A container according to the invention comprises an open-topped container body and a lid pivotally attached to the rear side of the body. The lid has an opening mechanism provided by an elongated tongue that projects downwardly from the front underside of the lid and, when the lid is closed, extends through a slot on the front wall of the body.

In some embodiments, the lid has a smooth flat top and no handles or grips other than the tongue. In other embodiments, when the lid is closed, its outer edges are recessed below and fully concealed by a railing surrounding the top opening of the body. The tongue thus provides the only opening mechanism for the lid.

Opening the lid requires two hands, one hand to push up on the tongue to lift the front of the lid until a gap is formed between the lid and the body, and a second hand to be inserted into the gap where it can then lift the lid to a fully opened position. Wild animals are unable to use two hands to open the lid in this manner.

The invention thus provides a lidded waste container that is resistant to opening by wild animals without requiring additional safeguards be taken to secure the container such as by using a bungle cord, latch assembly or locking mechanism.

BRIEF DESCRIPTION OF THE DRAWINGS

Exemplary embodiments of the invention will now be described with reference to the accompanying drawings, in which.

DETAILED DESCRIPTION OF THE ILLUSTRATED EMBODIMENTS

Figure 1:
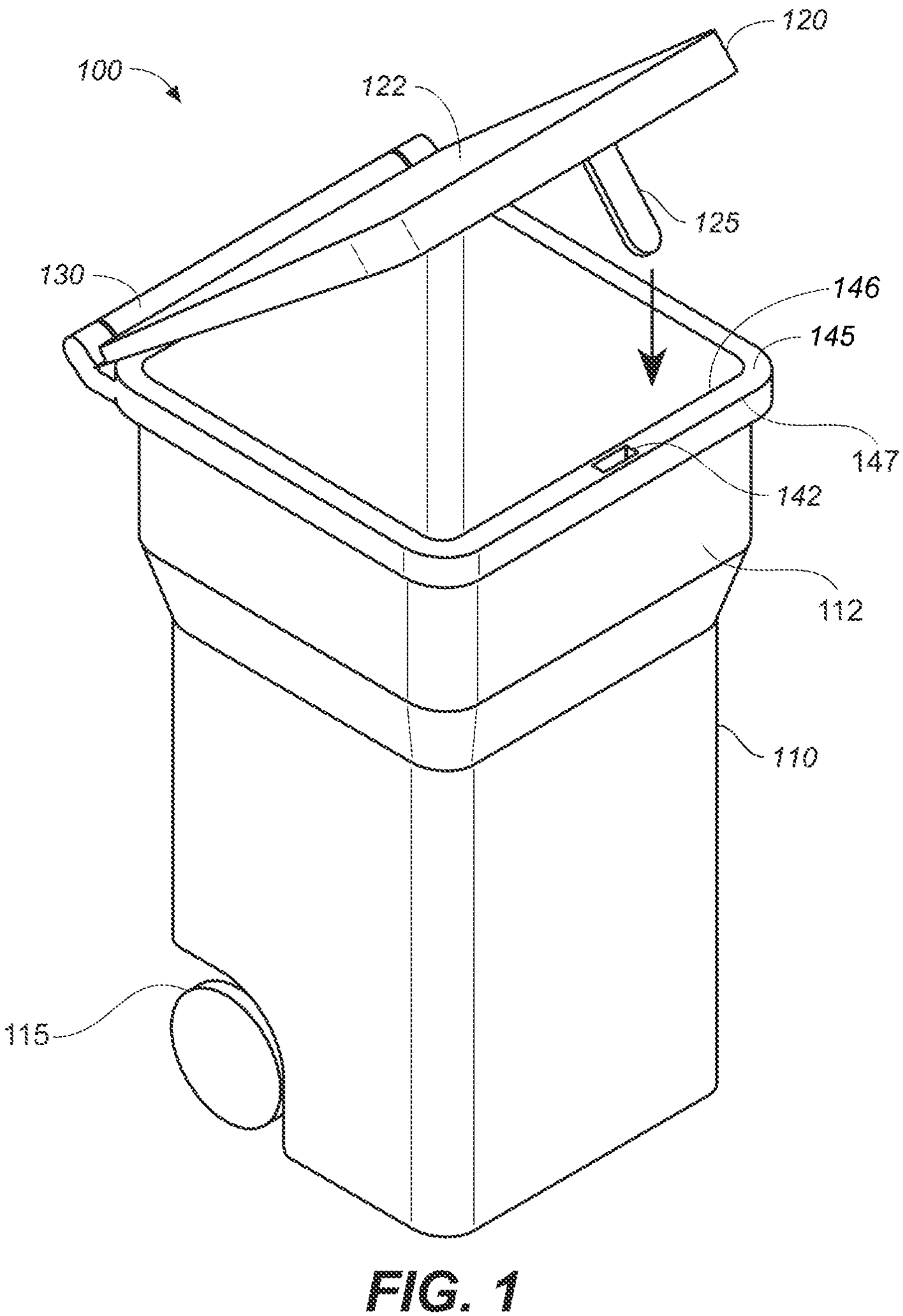
FIG. 1 is a perspective view of a lidded waste container according to the invention showing the lid in a partially opened position.

A refuse container lid opening device having a drop-down tongue according to the invention, indicated generally at 100 in FIG. 1, comprises an open-topped container body 110 and a lid 120 that is pivotally attached to the rear side of the body by a hinge 130. The lid 120 has a smooth flat top surface 122 and no handles or grips with which to open it. An elongated tongue 125 projects downwardly from a front portion of the underside of the lid. The tongue 125 may be integrally molded with the lid 120 or may otherwise be securely fastened to the lid but provides the only opening mechanism for the lid 120. The waste container 100 may optionally include wheels 115.

Figure 2:
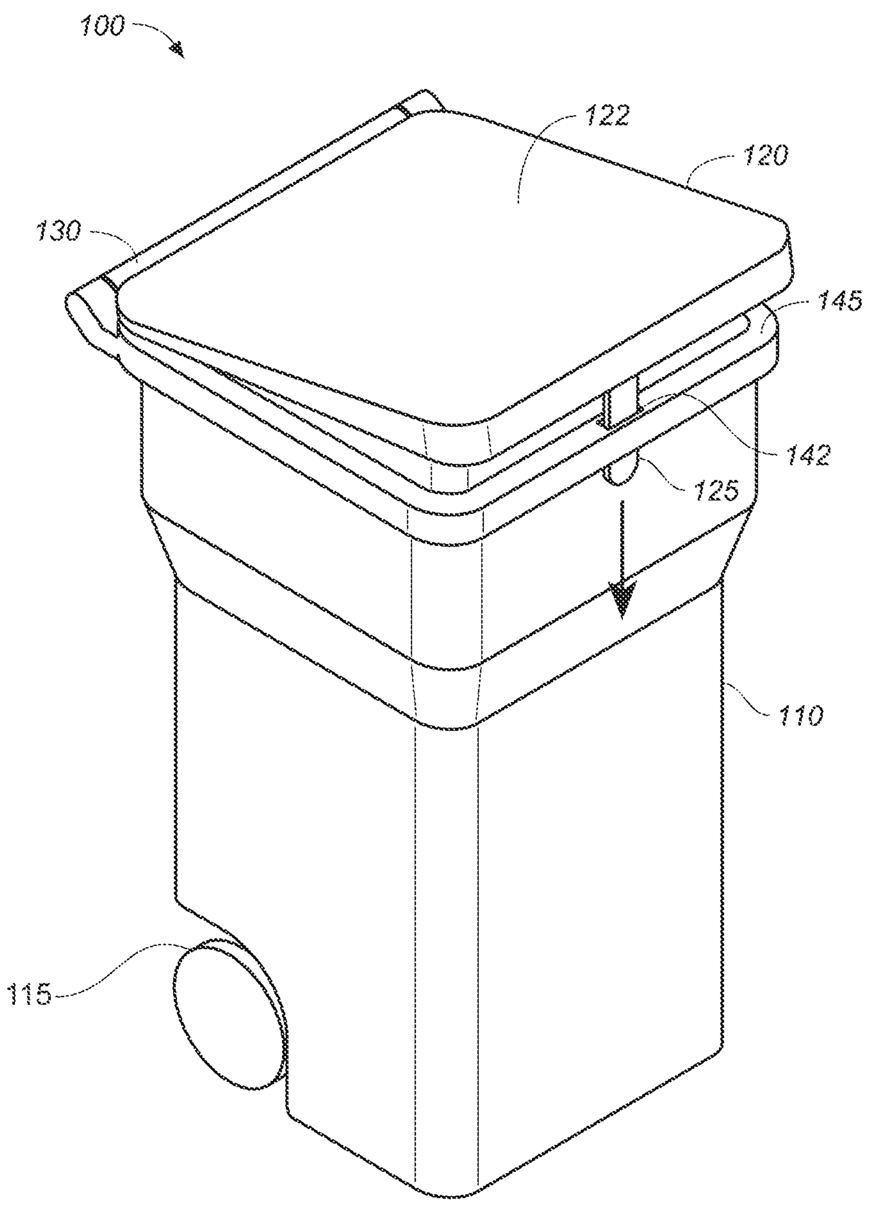
FIG. 2 is perspective view thereof showing the lid being moved towards the closed position.

When the lid 120 is closed, as shown in FIG. 2, the tongue 125 extends through a slot 142 on the front of the body 110. In the illustrated embodiment, the slot 142 is provided on the forward portion of an outwardly projecting top surface 145 bounded by inner edge 146 and outer edge 147 that extends horizontally from the front wall 112 of the container body 110. An outer face which extends downwardly from the top surface 145 forms a top rim that defines an opening to the container as can be seen in FIG. 1.

Figure 3:
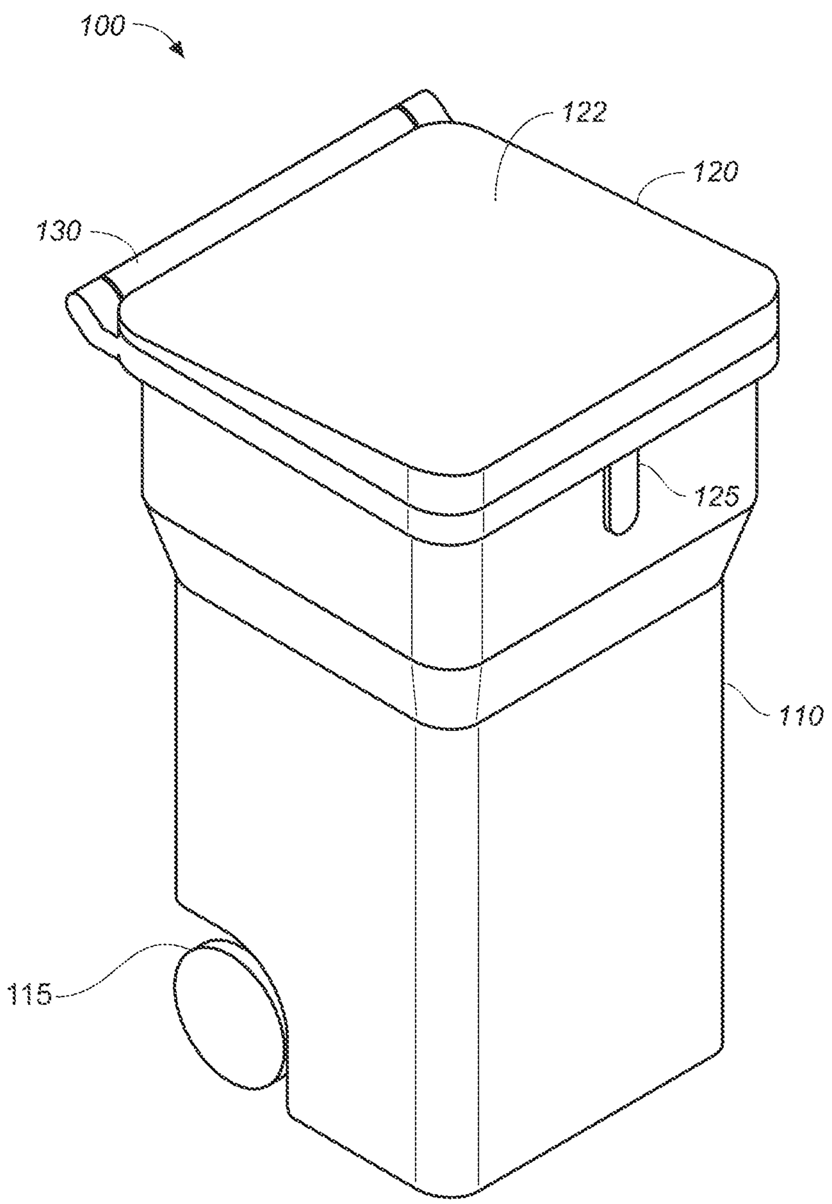
FIG. 3 is a perspective view thereof shown with the lid closed.
Figure 4:
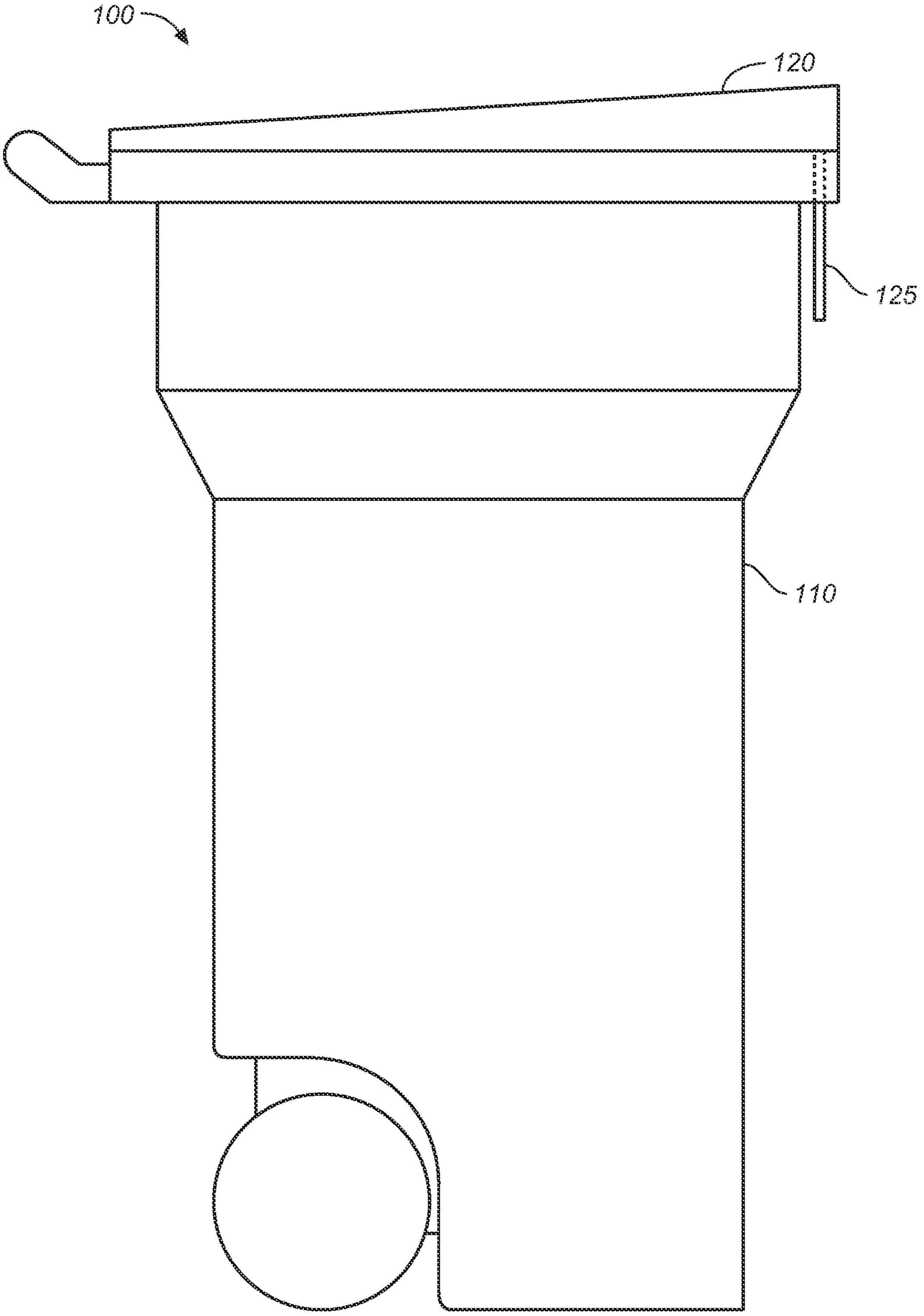
FIG. 4 is a side elevation view thereof.

As seen in FIGS. 3 and 4, when the lid 120 is closed, the tongue 125 is freely received in the slot 142 and extends substantially below the top surface 145 so as not to be removable from the slot 142 without being pushed upward. This substantial downward extension of the tongue 125 also prevents the tongue from falling out of the slot 142 if the container 100 is tipped over and keeps the tongue fully visible and accessible when the lid 120 is closed. Moreover, the outer face of the top rim and the outer surface of the lid collectively form a continuous uninterrupted surface that extends vertically from the top surface of the lid to the bottom edge of the outer face of the top rim, and horizontally along at least the front and side faces of the outer surface of the lid and the outer face of the top rim, which provide no grabbable points for a wild animal to use to pull up the lid for gaining access to the inside of the container.

Figure 5:
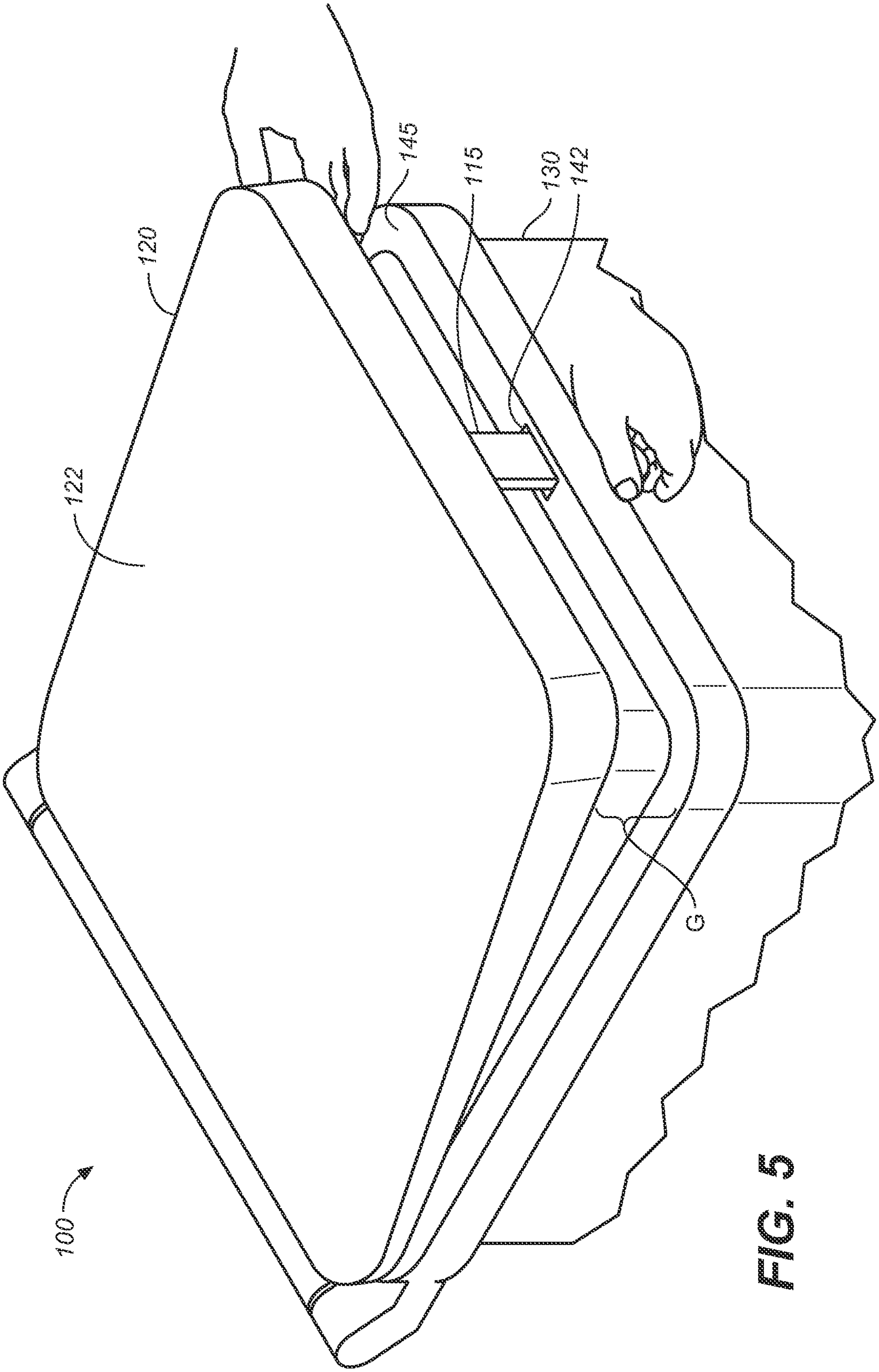
FIG. 5 is an enlarged, fragmentary perspective view thereof showing the lid being moved from a closed position to an open position.

Two hands are required to operate the tongue 125 and open the lid 120 of the container 100. As shown in FIG. 5, one hand is used to push up on the tongue 125 to lift the lid 120 until a gap G is formed between the lid 120 and the body 110. A second hand is then inserted into the gap G where it can be used to lift the lid 120 back to the fully opened position seen in FIG. 1. Wild animals are unable to use two hands to open the lid.

Figure 6:
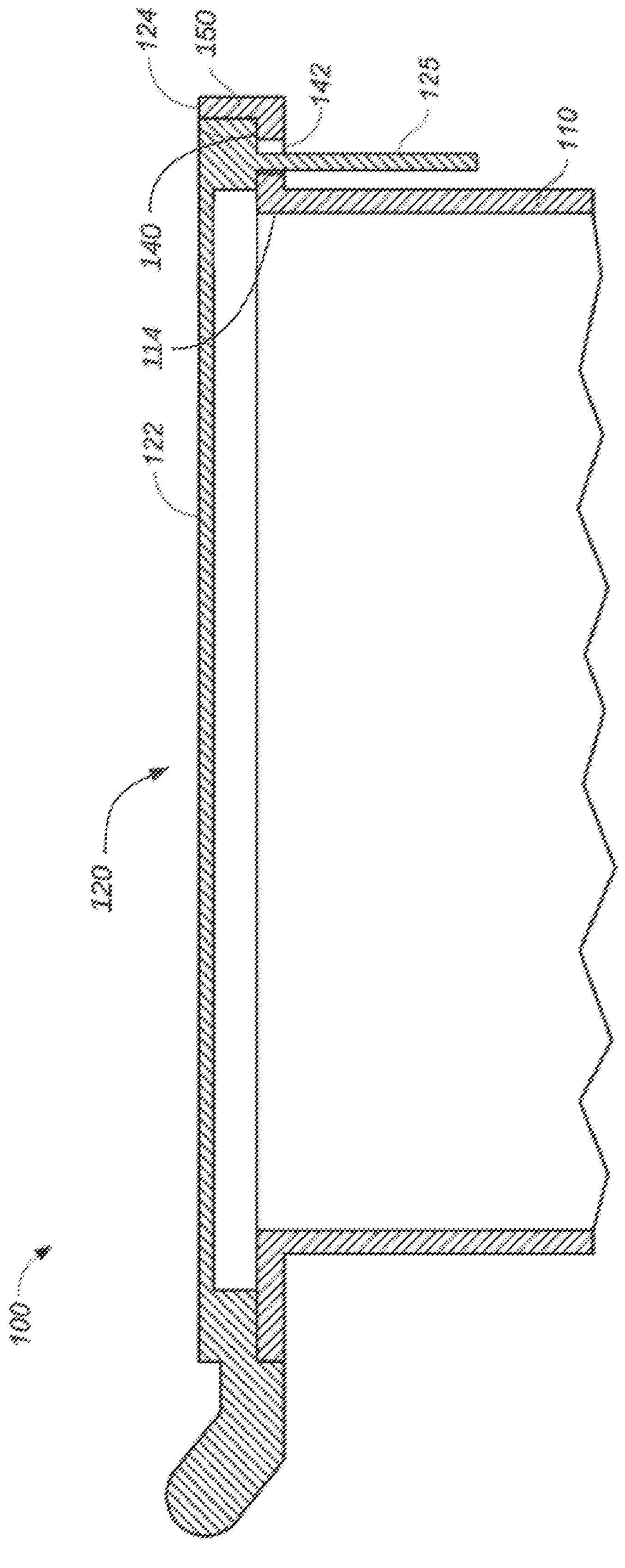
FIG. 6 is an enlarged, fragmentary sectional view of a second embodiment of a waste container according to the invention.
Figure 7:
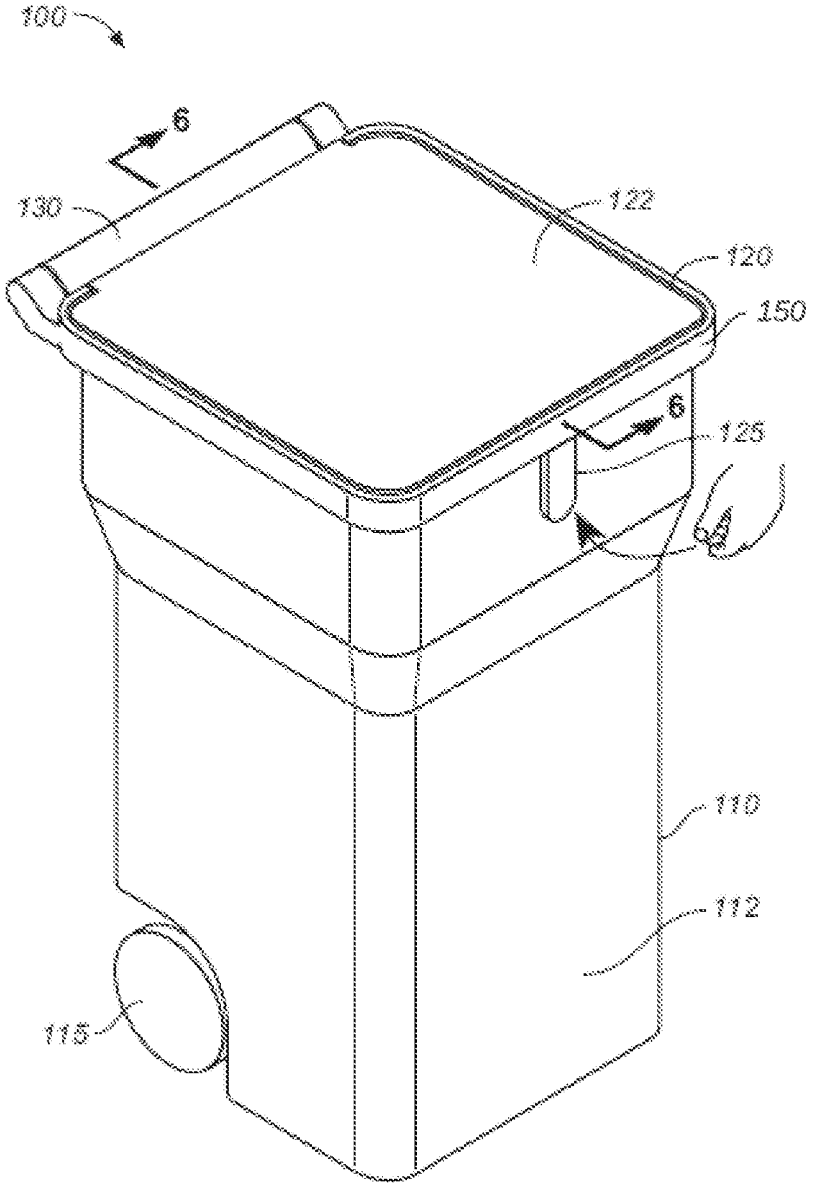
FIG. 7 is a perspective view thereof.

In FIGS. 6 and 7, a second embodiment of a waste container 100 according to the invention further includes a container body 110, the top portion of which forms a top rim 114. A horizontal support flange 140 extends outwardly from the rop rim 114 and a circumferential railing 150 that extends vertically from the horizontal support flange 140 such that the support flange 140 is bounded by the top rim 114 of the container body and by the railing 150. When the lid 120 is closed, the outer surface of the lid is disposed inwardly of and closely adjacent to the railing 150 and the flat top surface 122 of the lid 120 is positioned horizontally flush with the top edge 124 of the railing 150 with its outer edges flush with or recessed below the railing 150, thereby preventing wild animals from inserting their fingers or claws under the lid 120 to open the container 100 and ensuring that the tongue 125 is the only viable mechanism for opening the lid 120.

Certain embodiments of an animal resistant waste container have thus been described and illustrated herein in detail. These embodiments are merely exemplary implementations of the invention and are not intended to limit the scope of the invention to their particular details. Alternative embodiments of the invention not expressly disclosed herein will be evident to persons of ordinary skill in the art. For example, the invention can be embodied in other types of storage containers that need to be animal resistant, such as the outdoor food storage lockers commonly found at camping grounds.

I claim:

1. A refuse container lid opening device having a drop-down tongue comprising:

a container body having a top rim defining a top opening to the inside of the container body, the top rim having a horizontal top surface and an outer face descending from the horizontal top surface, the top surface bounded by an inner edge and an outer edge, the top surface also including a slot disposed between the inner and outer edges thereof, the outer face including front and side faces and a bottom edge, a lid hingedly attached to the top rim of the container body for covering the top opening, the lid having a top surface, an outer surface intersecting the top surface, and an underside, the outer surface including front and side faces, an elongated tongue descending from the underside of the lid freely received in the slot, a closed configuration in which the lid rests on the top rim of the container body, the outer surface of the lid is in planar alignment with the outer face of the top rim of the container body, the lid's outer surface and the top rim's outer face collectively forming a continuous uninterrupted surface that extends vertically from the top surface of the lid to the bottom edge of the outer face of the top rim of the container body and horizontally along the front and side faces of the outer surface of the lid and of the outer face of the top rim, the tongue is freely received in the slot, and the lid is upwardly movable by manipulating the tongue, and a partly open configuration in which the tongue remains received in the slot and the lid is raised above the top rim of the top opening thereby creating a manually accessible gap between the container body and the lid that provides access to the inside of the container.

2. The refuse container lid opening device having a drop-down tongue of claim 1 further comprising:

the lid having a smooth top surface free of grabbable handles or protuberances.

3. The refuse container lid opening device having a drop-down tongue of claim 1 further comprising:

the upper portion of the container below the top rim forming continuous adjacent smooth surfaces free of grabbable protuberances or recesses, and in the closed configuration the tongue extending below the bottom edge of the outer face of the top rim and manually accessible outward of the container body such that lifting the tongue raises the lid up from the top rim.

4. The refuse container lid opening device having a drop-down tongue of claim 1 wherein:

all surfaces of the tongue are uniformly planar and free of recesses and protuberances through the full length thereof enabling free movement of the tongue in the slot.

5. The refuse container lid opening device of claim 1 wherein:

a top portion of the tongue is disposed inwardly of the outer surface of the lid such that in the closed configuration the top portion is hidden behind the outer face of the top rim of the container body.

6. A refuse container lid opening device having a drop-down tongue comprising:

a container body having a top rim defining a top opening to the container body, a horizontal support flange extending outwardly from the top rim, the support flange having a bottom surface, a circumferential railing extending upwardly from the support flange, the support flange bounded by the top rim and the circumferential railing, the railing having a circumferential top edge, the support flange having a slot disposed between the top rim and the circumferential railing, a lid hingedly attached to the container body for covering the top opening, the lid having a top surface and an outer surface intersecting the top surface, an elongated tongue descending from the underside of the lid, and a closed configuration in which the lid rests on the support flange, the top surface of the lid is flush with or recessed below the top edge of the railing, and the tongue is received in the slot, the tongue extending below the bottom surface of the support flange and being manually accessible outside of the container body, such that upward movement of the tongue raises the lid up from the top rim.

7. The refuse container lid opening device having a drop-down tongue of claim 6 further comprising:

the railing having a vertical inner face, and the outer perimeter of the lid having an outer face, in the closed configuration the outer face of the perimeter of the lid being immediately adjacent to the inner face of the railing.

8. The refuse container lid opening device having a drop-down tongue of claim 6 further comprising:

a partly open configuration in which the tongue remains received in the slot and the lid is raised above the top rim of the top opening thereby forming a manually accessible gap between the container body and the lid that provides access to the inside of the container.

9. The refuse container lid opening device having a drop-down tongue of claim 6 further comprising:

the lid having a smooth top surface free of grabbable handles or protuberances.

10. The refuse container lid opening device of claim 6 further comprising:

the container body having a front wall free of recesses such that in the closed configuration the tongue is disposed forward of the front wall for ease of accessibility by a user.

11. A refuse container lid opening device having a drop-down tongue comprising:

a container body having a top rim defining a top opening to the container body, a horizontal support flange extending outwardly from the top rim, and a circumferential railing extending upwardly from the support flange, the railing including an inner face and a top edge, the support flange having a slot disposed between the top rim the circumferential railing, a lid hingedly attached to the top rim of the container body for covering the top opening, the lid having a top surface, an underside, and a perimeter face extending perpendicularly from the top surface, the top surface free of grabbable handles or protuberances, an elongated tongue spaced inwardly from the railing and descending from the underside of the lid, a closed configuration in which the lid rests on the support flange, the perimeter face is disposed immediately adjacent to the inner face of the railing at or below the top edge of the railing such that the perimeter face is hidden behind the railing, and the tongue is freely received in the slot, extends below the support flange, and is manually accessible outward of the container body, such that upward movement of the tongue raises the lid up from the top rim, and a partly open configuration in which the tongue remains received in the slot and the lid is raised above the top rim thereby creating a manually accessible gap between the container body and the lid that provides access to the inside of the container.

12. The refuse container lid opening device of claim 11 further comprising:

the slot in the support flange disposed forward of the front wall of the container body.

* * * * *